Sept. 28, 1937.    P. B. KITTEL    2,094,174
SPRING MOUNTING OF VEHICLE BODIES
Filed Nov. 9, 1935    4 Sheets-Sheet 1
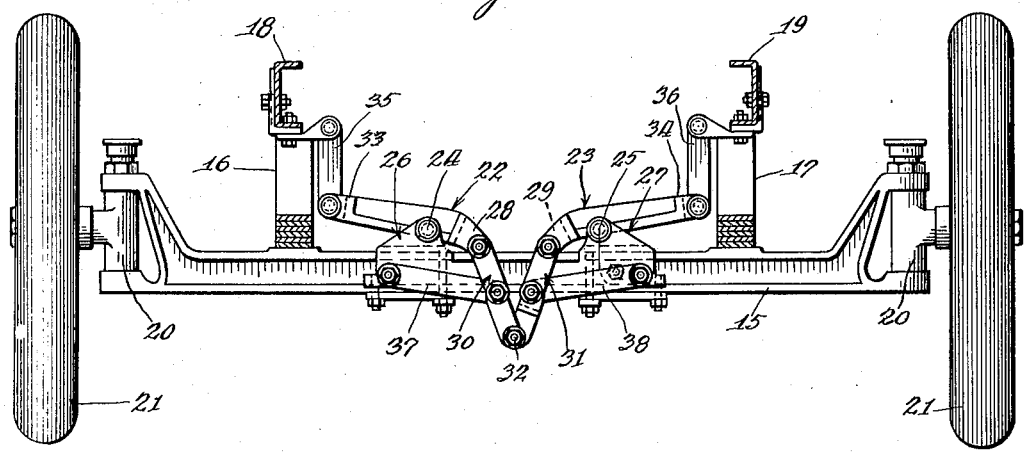
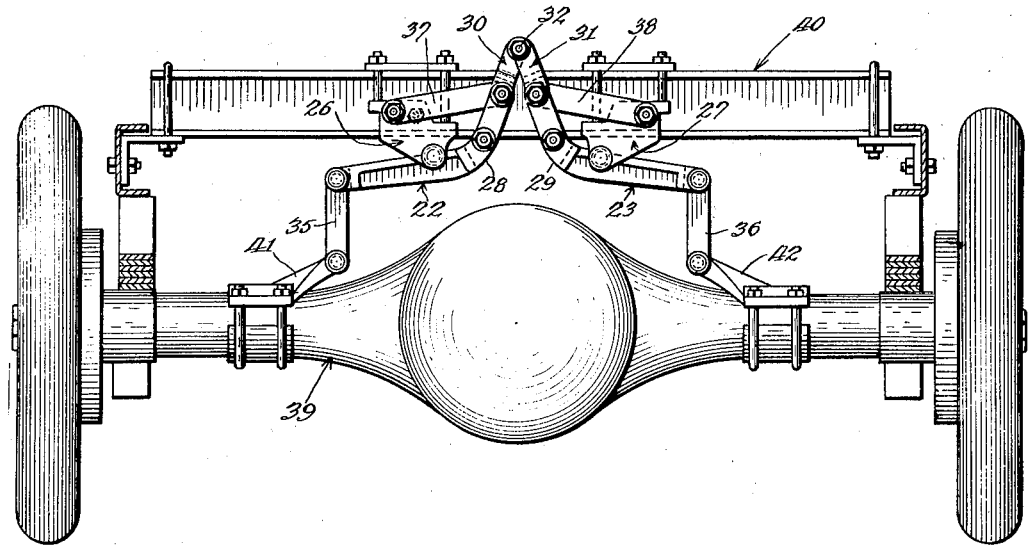
Inventor:
Paul Bruno Kittel
By Jones, Addington, Ames & Seibold
Attys.

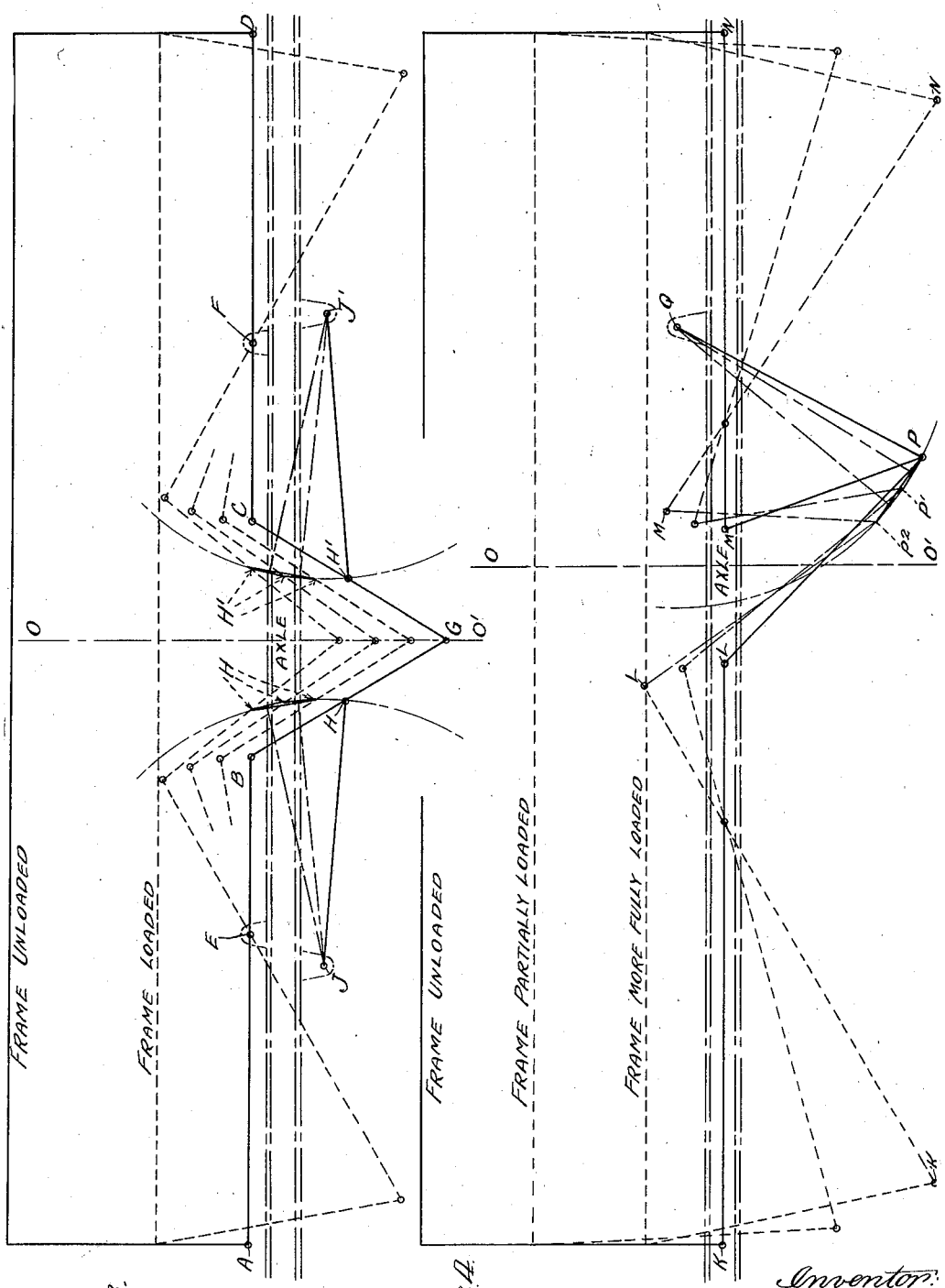

Sept. 28, 1937.  P. B. KITTEL  2,094,174

SPRING MOUNTING OF VEHICLE BODIES

Filed Nov. 9, 1935  4 Sheets-Sheet 3

Inventor:
Paul Bruno Kittel

Patented Sept. 28, 1937

2,094,174

UNITED STATES PATENT OFFICE 2,094,174

SPRING MOUNTING OF VEHICLE BODIES

Paul Bruno Kittel, Hampstead, London, England, assignor of one-third to Bertram J. Grigsby, Chicago, Ill.

Application November 9, 1935, Serial No. 48,995
In Great Britain November 16, 1934

11 Claims. (Cl. 267—11)

This invention relates to improvements in or relating to the spring mounting of vehicle bodies and has special reference to the provision of a linkage mechanism between a mobile support and the carriage or body of a vehicle whereby the ordinary displacement caused by loading or by stresses arising in travelling results in a uniform displacement of the springs resting on the axle or axles of the vehicle for resiliently supporting the carriage.

More particularly, this invention relates to linkage mechanism for the spring mounting or suspension of vehicle bodies comprising double-armed levers pivotally secured on the supporting means having means for connecting the non-adjacent ends of the levers with the body frame and links for connecting the adjacent ends of the levers, the links in turn being connected by one or more rods or strut bars to the axle or supporting means of the vehicle whereby parallel motion between the plane of the body frame and the plane of the axle is sustained.

It will be hereinafter noted that the double-armed levers may also be pivotally secured on the body frame, whereafter the non-adjacent ends of the levers would be connected to the axles or supporting means. All of the pressure members are preferably non-flexible and rigid and there is no lost motion at the pivotal connections.

The present invention contemplates the provision of a uniform displacement of the springs of a vehicle, for example, when subjected to road shocks and the like. Where the springs are independent, a shock to one wheel, being opposed substantially by the weight borne by that wheel only, is followed by a greater oscillation than if that shock were opposed by the inertia of the whole or the greater part of the automobile. The uniform displacement of the springs has the latter effect upon a vehicle.

It is, of course, apparent that a relatively small automobile, because of its light weight, will be affected by road shocks more easily than a relatively heavy automobile because of the greater inertia of the latter. It follows that if the weight of an automobile resting on its springs is so distributed over the several springs that a shock at one point is opposed by the whole weight or at least the greater part of the weight of the automobile, the resistance of the springs being uniform, the resulting oscillations will be minimized.

One of the objects of this invention is to provide a linkage mechanism of the character above described in a vehicle which will minimize canting on corners, permitting a maximum safety in turning corners at greater speed.

Another object of this invention is to provide a linkage mechanism of the type above noted in vehicles wherein violent oscillation or sidesway is prevented.

A further object of this invention is to provide a linkage mechanism of the kind above described in vehicles wherein less skill or judgment is required on the part of the driver to obtain safer and more accurate steering.

A still further object of this invention is to provide a linkage mechanism as before noted wherein riding is improved, there being less bouncing and swaying over irregularities because recoils are damped out.

It is also the object of this invention to provide a linkage mechanism of the type above recited in vehicles to minimize the danger of skidding, the vehicle being more easily controlled.

Again, it is one of the objects of this invention to provide a linkage mechanism of the above character in vehicles wherein it will be possible to employ substantially weaker springs.

Other objects and advantages will hereinafter be more fully pointed out and, for a more complete understanding of the characteristic features of this invention, reference may be had to the following description when read together with the accompanying drawings, in which latter:

Figure 1 is a front elevational view of linkage mechanism embodying the present invention as applied to the front axle of an automobile, a portion of the latter being shown in section;

Fig. 2 is a front elevational view of the mechanism of Fig. 1 inverted for application to the rear axle of an automobile, a portion of the latter being shown in section;

Fig. 3 is a diagrammatic view of the mechanism shown in Fig. 1 showing the manner of locating the linkage mechanism and predetermining the pivotal points thereof to effect uniform movements of the links and thereby relative substantially parallel movements of the body frame and supporting means;

Fig. 4 is a view similar to Fig. 3 of a modified form of linkage mechanism embodying this invention;

Figure 5:
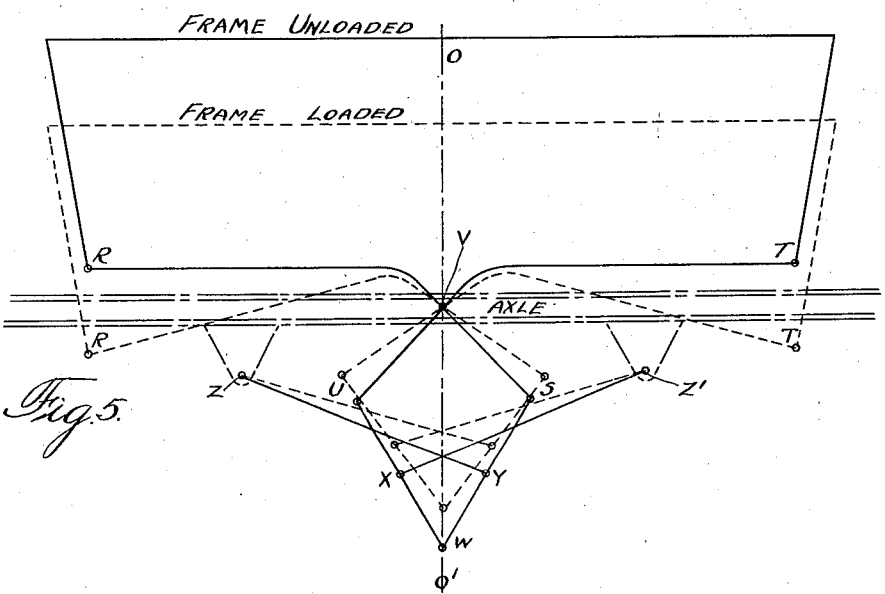
Fig. 5 is a diagrammatic view of a further modified form of linkage mechanism embodying the features of this invention showing a normal position of the mechanism in full lines and a changed position in dotted lines.

5 showing still further modifications of linkage mechanisms embodying this invention.

Referring to the drawings and more particularly to Figure 1 thereof, a linkage mechanism embodying the features of this invention is shown in its application to the front axle of a vehicle, there being a supporting member or axle 15 upon which are mounted the spaced springs 16 and 17 for supporting the channels 18 and 19 forming a part of the supported member or frame of the vehicle carriage or body. The axle 15 is, of course, provided with the usual fittings for steering, including the steering knuckle pivots 20 upon which the wheels 21 are rotatably mounted.

In the preferred embodiment of this invention illustrated in the present described Figure 1, two double-armed levers 22 and 23 are pivotally mounted on pins 24 and 25, respectively, of brackets 26 and 27. The brackets 26 and 27 are suitably secured to the axle 15 in a spaced relation. The adjacent ends 28 and 29, respectively, of the levers 22 and 23, are joined by links 30 and 31, one end of link 30 being pivotally connected to the end 28 of lever 22, the other end of the link 30 being pivotally connected at 32 to the free end of link 31, the other end of link 31 being pivotally connected to the end 29 of the lever 23. The ends 33 and 34 of the double-armed levers 22 and 23, respectively, are attached to the channels 18 and 19 by any suitable means such as the arms 35 and 36, respectively, one end of each of the arms being pivotally connected to the double-armed lever, and the other end of each of the arms being pivotally connected to a bracket secured to the underneath side of the channel 18. Strut bars 37 and 38 are connected between the axle and an intermediate portion of the links 30 and 31, respectively, one end of each of the strut bars being preferably pivotally connected to its respective bracket 26 or 27, the other end of the strut bars being pivotally connected to its respective link 30 or 31 at a point substantially midway of the ends thereof.

In order to predetermine the location of the linkage mechanism with respect to the carriage and axle of the vehicle, and to predetermine the pivotal points thereof to effect uniform movements of the links so that relative parallel movements of the body frame and supporting means are obtained, reference may now be had to Figure 3 of the drawings which shows diagrammatically the structure just described in Figure 1. Two double-armed levers AB and CD, corresponding respectively to the double-armed levers 22 and 23 of Figure 1, are set up by pins upon the axle in the manner just described, the pivotal points E and F corresponding to the pins 24 and 25 of Figure 1. The adjacent ends of these levers are then joined by two links BG and CG, the two latter links being the same as links 30 and 31, respectively, of Figure 1. Two points H and H' are taken at or near the midpoint of each link. The other ends of the double-armed levers A and D are attached to the frame of a carriage.

The apparatus being connected in the above manner, the body of the vehicle is caused to approach the axle against spring compression so that its horizontal line remains constantly parallel with the horizontal line of the axle to a position indicated by the horizontal dotted line marked "Frame loaded", the initial position being marked "Frame unloaded." During the course of this movement, three positions of the points H and H', respectively, upon the link bars have been indicated in dotted lines, the positions being three changed positions aside from the normal position. These positions H and H' form the angular points of two triangles, respectively, the triangles being indicated in somewhat heavy lines. Projections at right angles are drawn from the midpoint of the sides of these triangles, and, at the intersections of these lines, two points J and J' are found. The projections from the midpoints of the sides of the triangles are shown in dot-dash lines.

Pins are mounted upon lugs or offsets from the axle such, for example, as is indicated by the brackets 26 and 27 in Figure 1, the pins being located at the points J and J'. The points J and J' are, by means of these pins and pins upon the link bars BG and CG, connected together by strut bars JH and J'H' which correspond, respectively, to the strut bars 37 and 38 of Figure 1. The mechanism is then operative and is similarly operative with one only of the strut bars. It is quite apparent that it would merely be necessary to have one guide member or strut bar, either bar 37 or bar 38, although, of course, it may be preferable in this instance to employ guide means on opposite sides of the midpoint OO' of the axle.

The points J and J' each define a center for a radius describing an arc along which passes the various changed positions of the points H and H' when the frame and axle move in relatively parallel positions. Thus, by referring to Figure 1, a downward movement of the channels 19 supporting the vehicle body would cause a pivotal movement of the double-armed lever 23, the end of the lever 29 raising and moving therewith the pivotally connected links 30 and 31. These links 30 and 31 are, of course, caused to be moved in a plane such that the pivotal point 32 moves vertically, or, as in Figure 3, along the vertical line OO'. Such movement, of course, causes a similar upward movement of the end of the lever bar 28 to pull the channel 18 downwardly. The movement downwardly of either of the frame members 18 and 19, caused by loading or by stresses arising in travelling, results in the downward movement of the other and, therefore, in a uniform displacement of the springs resting on the axle 15.

Referring now more particularly to Figure 2, the same linkage mechanism as described in Figure 1 is shown in a reversed relation with respect to the supporting and supported members or, in the present example, the axle and the body frame respectively. Further, this mechanism is shown in its relation with the rear axle 39 of a vehicle, the linkage mechanism being mounted on the vehicle body frame 40. The arms 35 and 36, instead of being pivotally attached to the body frame, are secured to brackets 41 and 42, respectively, and attached to the axle. The brackets 26 and 27, on which the double-armed levers 22 and 23 are pivoted, are in the present instance secured to the vehicle body frame 40. The actuation of the linkage mechanism is precisely the same in either instance and a description of one will suffice for the other.

In Figure 3 a linkage mechanism was described wherein parts of the mechanism were disposed on each side of the line OO' which cut the midpoint of the axle and frame. However, by referring more particularly to Figure 4, the parts of the mechanism are not disposed symmetrically on each side of the line OO', the latter likewise representing the midpoint of the axle. Two double-armed levers KL and MN are pivotally mounted on pins upon the axle indicated by dot-dash lines. The adjacent ends of these levers are then joined by two links LP and MP. The body of the vehicle is caused to approach the axle against spring compression so that its horizontal line remains constantly parallel with the horizontal line of the axle as illustrated in the dotted line positions shown. During the course of this movement, three positions of the point P are observed. One position is the normal position indicated by the term "Frame unloaded"; the second position is indicated by the phrase "Frame partially loaded"; and the third position is indicated by the phrase "Frame more fully loaded." Three positions of the point P are taken and these three positions P, P', P'' form angular points of a triangle. Projections at the right angles are made at the midpoints of the sides of each triangle as indicated by the dot-dash lines, the intersection of the lines being indicated by the letter Q. The point Q is connected to the point P by means of a strut bar and causes the mechanism to actuate as in the previously described embodiment. The arc described by the radius QP using Q as the center point is common to the position of the pivotal point P as the frame and axle have relative parallel movement. This single strut bar QP thus prevents any motion excepting parallel motion between the body frame and the axle. The mounting of the linkage mechanism just described, as well as of those that follow, may be reversed as in Figures 1 and 2.

In a modification of this linkage mechanism as illustrated in Figure 5, two double-armed levers RS and TU are pivotally mounted on a single pin V on an axle of the vehicle. The adjacent ends U and S of the double-armed levers are joined by links UW and SW. The opposite ends R and T of the double-armed levers are joined to the frame in the manner previously described with reference to Figure 1. Also similarly to the method disclosed in Figure 3, three positions of the points X and Y are determined, these points being at or near the midpoint of each link, respectively, and, as previously pointed out with respect to the triangles formed at three similar positions, point Z and Z' are determined. Strut bars ZY and Z'X are connected to the links SW and UW, respectively, causing the mechanism to be operative in the same manner as those mechanisms previously described. Alternatively, where the mechanism is not symmetrical about the line OO', a single strut bar may be attached to E connecting E with a point, the position of which is arrived at as has been described in Figure 4.

Figure 6:
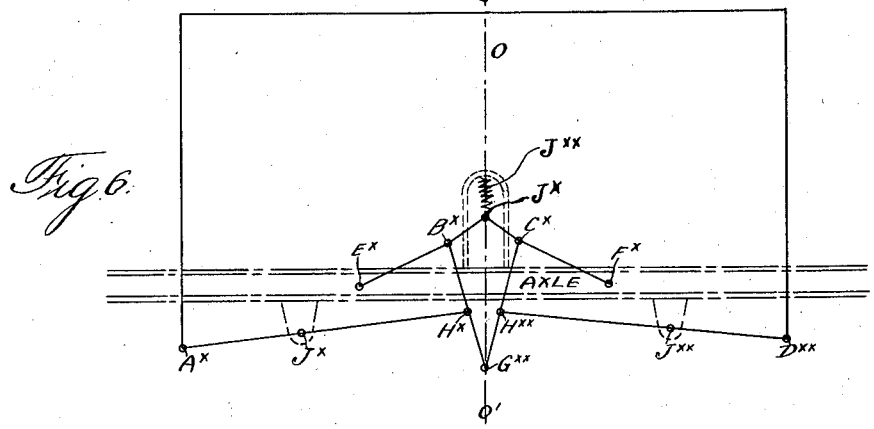
Figs. 6, 7, 8, 9, and 10 are views similar to Fig.

Referring now more particularly to Figure 6, the usual strut bars $J^xH^x$ and $H^{xx}J^{xx}$ may be prolonged so as to act as double-armed levers $A^xJ^xH^x$ and $H^{xx}J^{xx}D^{xx}$, the bars $E^xB^x$ and $C^xF^x$ then acting as strut bars. The relation of these members may readily be ascertained by the similarity of the reference letters, the corresponding letters having different exponents. To the mechanism of Figure 6, or to any of these mechanisms above described, locking bars such, for example, as the rigid bars $B^xJ^x$ and $J^xC^x$ are pivotally connected at $J^x$ or may be introduced between any two parts of the mechanism which recede from one another during spring compression. Bars $B^xJ^x$ and $J^xC^x$ are designed to studs at $B^x$ and $C^x$, these bars being so designed that on loading they recede from each other and come to a dead center when the spring displacement the vehicle is designed for has been reached, thus forming a lock, the same locking bar having a release spring $J^{xx}$ which causes them to unlock when the stress or weight giving rise to the locking is moved.

Figure 7:
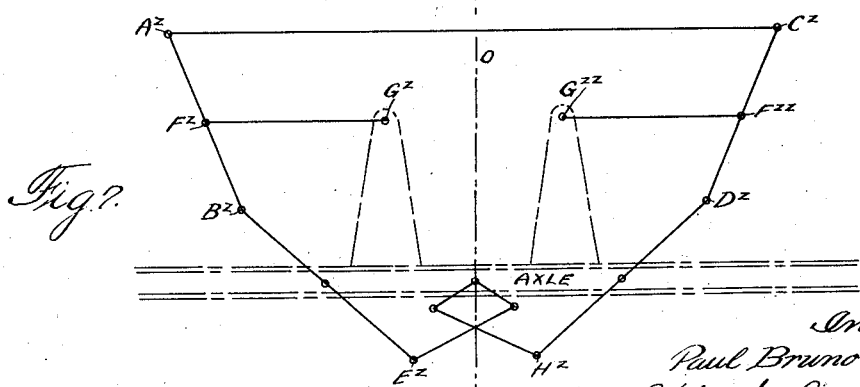

Referring now more particularly to Figure 7, a mechanism is constructed in which two rods $A^zB^z$ and $C^zD^z$ are attached to the frame of the vehicle, the opposite ends being each connected to a double-armed lever $B^zE^z$ and $D^zH^z$ and pivotally connected to an intermediate point thereof to the axle. Points $F^z$ and $F^{zz}$ are taken at or near the midpoint of the rods $A^zB^z$ and $C^zD^z$ and three observations are taken of these during excursions of the frame of the vehicle to and from the axle during spring compression. As previously pointed out in Figures 3 and 4, these three points forming angular points of two triangles, respectively, projections at right angles are made from the midpoints at the sides of each triangle and at the intersections of these projections two points $G^z$ and $G^{zz}$ are found which are connected by strut bars with the points $F^z$ and $F^{zz}$, respectively, on the foregoing rods $A^zB^z$ and $C^zD^z$. The unattached ends of the double-armed levers $E^z$ and $H^z$ are attached to the axle by means of lazy tongs.

Figure 8:
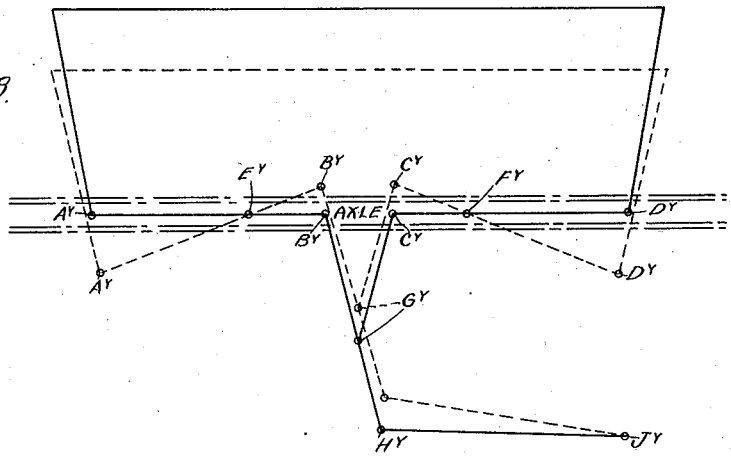
Figure 9:
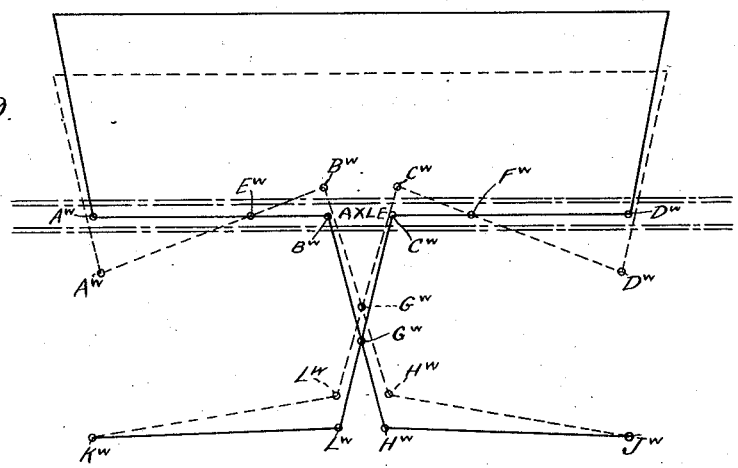

Referring now more particularly to Figure 8, the strut bar $H^yJ^y$ may be connected to a prolongation of the link bar $B^yG^y$, or as illustrated in Figure 9, the mechanism may comprise two strut bars $H^wJ^w$ and $K^wL^w$ connected to prolongations of the link bars $B^wG^w$ and $C^wG^w$, respectively.

Figure 10:
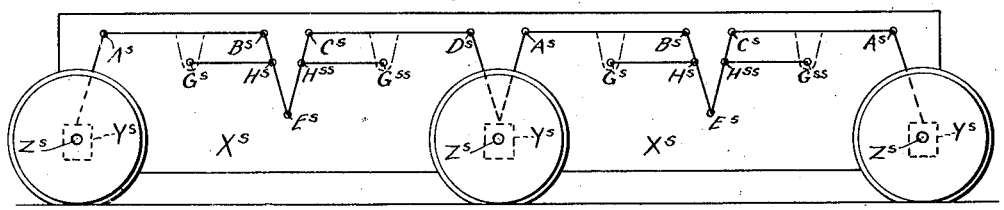

Any of these mechanisms above described may be constructed so as to operate at the sides of a rail vehicle between the axle ends of the same side as shown more particularly in Figure 10. For example, in such a case, the double-armed levers $A^sB^s$ and $C^sD^s$, the links $B^sE^s$ and $C^sE^s$ and their connections are pivotally connected to the frame $X^s$ of the vehicle, the unattached ends $A^s$ and $D^s$ of the double-armed levers being connected by rod means with the axles or axle boxes $Y^s$ and the axles $Z^s$.

The foregoing invention may be adapted for use upon any vehicle mounted on springs, such as a road vehicle, rail vehicle, trolley and so forth. When it is used upon a road vehicle, for example, it operates so that the carriage recedes or approaches the axle in a parallel manner, the vehicle being stationary during loading and unloading or travelling upon uneven ground or upon curves. The same mechanism applied to a rail vehicle prevents wheels which engage in irregularities, such as junctions and the like, from sinking into those irregularities, the wheel concerned being supported by the counterpoise of the remaining portion of the vehicle not supported by that wheel. The position of the springs is not material provided they are attached so as to be operative between the frame and the axle and may therefore be incorporated in the mechanism.

While several embodiments of this invention are herein shown and described, it is to be understood that various modifications thereof may be apparent to those skilled in the art without departing from the spirit and scope of this invention and, therefore, the same is only to be limited by the scope of the prior art and the appended claims.

I claim:

1. Linkage mechanism between the supporting and supported members of a vehicle comprising double-armed levers pivotally secured to one of said members, means connecting one arm of each of said levers to the other of said members, links pivotally connected to the other arm of each of said levers, and at least one strut bar pivotally connected between the member on which the double-armed levers are pivoted and one of said links, the pivotal location and length of the strut bar being predetermined to cause uniform movement of said double-armed levers thereby sustaining a substantially parallel relation between the supporting and supported members.

2. Linkage mechanism between the supporting and supported members of a vehicle comprising double-armed levers pivotally secured to one of said members, means connecting one arm of each of said levers to the other of said members, links pivotally connected together and to the other arm of each of said levers, and at least one strut bar pivotally connected between the member on which the double-armed levers are pivoted and one of said links, the pivotal location and length of the strut bar being predetermined to cause uniform movement of said double-armed levers thereby sustaining a substantially parallel relation between the supporting and supported members.

3. Linkage mechanism between the supporting and supported members of a vehicle comprising double-armed levers pivotally secured to one of said members, means connecting the non-adjacent ends of said levers to the other of said members, links pivotally connected together and to the adjacent ends of said levers, and at least one strut bar pivotally connected between the member on which the double-armed levers are pivoted and one of said links, the pivotal location and length of the strut bar being predetermined to cause uniform movement of said double-armed levers thereby sustaining a substantially parallel relation between the supporting and supported members.

4. Linkage mechanism between the supporting and supported members of a vehicle comprising a pair of double-armed levers pivotally secured to one of said members, means connecting one arm of each of said levers to the other of said members, a pair of links pivotally connected together at adjacent ends, the other ends of said links being pivotally connected to the other arms of said levers, and at least one strut bar pivotally connected between the member on which the double-armed levers are pivoted and one of said links, the pivotal location and length of the strut bar being predetermined to cause uniform movement of said double-armed levers thereby sustaining a substantially parallel relation between the supporting and supported members.

5. Linkage mechanism between the supporting and supported members of a vehicle comprising double-armed levers pivotally secured to the supporting member of the vehicle, means connecting one arm of each of said levers to the supported member of the vehicle, links pivotally connected together and to the other arm of each of said levers, and at least one strut bar pivotally connected between the supporting member and one of said links at a point midway between the pivotal connections thereof, the pivotal location and length of the strut bar being predetermined to cause uniform movement of said double-armed levers thereby sustaining a substantially parallel relation between the supporting and supported members.

6. Linkage mechanism between the supporting and supported members of a vehicle comprising double-armed levers pivotally secured to one of said members, means connecting one arm of each of said levers to the other of said members, a pair of links of the same length between pivotal points, said links being pivotally connected together and to the other arm of each of said levers, and at least one strut bar pivotally connected between the member on which the double-armed levers are pivoted and one of said links, the pivotal location and length of the strut bar being predetermined to cause uniform movement of said double-armed levers thereby sustaining a substantially parallel relation between the supporting and supported members.

7. Linkage mechanism between the supporting and supported members of a vehicle comprising double-armed levers of unequal length pivotally secured to one of said members, means connecting one arm of each of said levers to the other of said members, a pair of links of unequal length between pivotal points, said links being pivotally connected together and to the other arm of each of said levers, and a strut bar pivotally connected between the member on which the double-armed levers are pivoted and said links, the pivotal location and length of the strut bar being predetermined to cause uniform movement of said double-armed levers thereby sustaining a substantially parallel relation between the supporting and supported members.

8. Linkage mechanism between the supporting and supported members of a vehicle comprising double-armed levers pivotally secured to one of said members, means connecting one arm of each of said levers to the other of said members, a pair of links pivotally connected together and to the other arm of each of said levers, at least one of the links extending beyond the point of pivotal connection, and at least one strut bar pivotally connected between the member on which the double-armed levers are pivoted and the extension of one of said links, the pivotal location and length of the strut bar being predetermined to cause uniform movement of said double-armed levers thereby sustaining a substantially parallel relation between the supporting and supported members.

9. Linkage mechanism between the supporting and supported members of a vehicle comprising double-armed levers pivotally secured to one of said members, means connecting one arm of each of said levers to the other of said members, a pair of links pivotally connected together and to the other arm of each of said levers, both of said links extending beyond the point of pivotal connection, and a strut bar pivotally connected between the member on which the double-armed levers are pivoted and each of the extensions of said links, the pivotal location and length of the strut bar being predetermined to cause uniform movement of said double-armed levers thereby sustaining a substantially parallel relation between the supporting and supported members.

10. Linkage mechanism between the supporting and supported members of a vehicle comprising double-armed levers pivotally secured on separate fulcrums to one of said members, means connecting one arm of each of said levers to the other of said members, links pivotally connected together and to the other arm of each of said levers, and at least one strut bar pivotally connected between the member on which the double-armed levers are pivoted and one of said links, the pivotal location and length of the strut bar being predetermined to cause uniform movement of said double-armed levers thereby sustaining a substantially parallel relation between the supporting and supported members.

11. Linkage mechanism between the supporting and supported members of a vehicle comprising double-armed levers pivotally secured to one of said members, means connecting one arm of each of said levers to the other of said members, links pivotally connected together and to the other arm of each of said levers, and a strut bar pivotally connected between the member on which the double-armed levers are pivoted and each of said links, the pivotal location and length of the strut bars being predetermined to cause uniform movement of said double-armed levers thereby sustaining a substantially parallel relation between the supporting and supported members.

PAUL BRUNO KITTEL.